United States Patent
Jan et al.

(10) Patent No.: US 6,300,016 B1
(45) Date of Patent: Oct. 9, 2001

(54) POLYCARBONATE ELECTROLYTE, THE PREPARATION THEREOF AND POLYMER LITHIUM BATTERIES CONTAINING THE SAME

(75) Inventors: Yih-Song Jan, Taipei; Jong-Ming Lin, Hsinchu; Mei-Hui Wang, Taipei; Sheng-Feng Wu, Hsinchu Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/384,800

(22) Filed: Aug. 27, 1999

(30) Foreign Application Priority Data

May 31, 1999 (TW) .................................. 88108953

(51) Int. Cl.$^7$ .................................................. H01M 6/16
(52) U.S. Cl. .................... 429/324; 429/188; 429/303; 429/306; 429/307; 429/310; 429/320; 429/336; 429/338; 429/347
(58) Field of Search .................... 429/188, 303, 429/306, 307, 310, 320, 324, 338, 347, 200, 336

(56) References Cited
FOREIGN PATENT DOCUMENTS

11060870 * 3/1999 (JP) .

* cited by examiner

Primary Examiner—Carol Chaney
Assistant Examiner—Dah-Wei Yuan
(74) Attorney, Agent, or Firm—Ladas & Parry

(57) ABSTRACT

A polycarbonate electrolyte comprising a polycarbonate membrane matrix and a lithium salt-containing electrolytic solution impregnated into the polycarbonate membrane matrix. The polycarbonate has the formula:

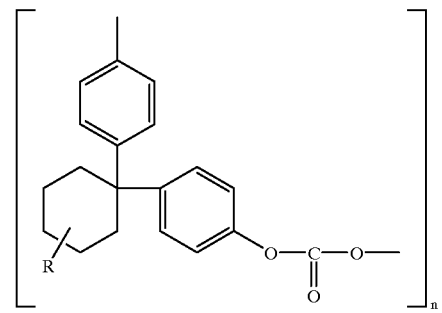

18 Claims, 3 Drawing Sheets

POLYCARBONATE ELECTROLYTE, THE PREPARATION THEREOF AND POLYMER LITHIUM BATTERIES CONTAINING THE SAME

FIELD OF THE INVENTION

The present invention relates to a polycarbonate electrolyte. More particularly, it relates to a polycarbonate electrolyte composition, its preparation and its application in lithium batteries.

DESCRIPTION OF THE RELATED ARTS

Because lithium batteries have excellent performance in both energy density and battery life, they have been widely applied in recent years. However, with the miniaturization of semi-conductor devices and the increased performance of portable electronic products in the market, there has been a demand for lighter and thinner lithium batteries.

Traditional lithium batteries use liquid organic electrolyte, and thus must be enclosed in a metal can. Due to thickness requirements in the production of the metal can, a lithium battery having liquid organic electrolyte is limited in terms of thickness. Therefore, it cannot meet the current demands for a lighter and thinner battery.

Thus, in recent years, a polymer lithium battery in which the liquid organic electrolyte is replaced by polymer electrolyte has been formatively developed. Because it is not enclosed in metal can, the thickness limitations are decreased. However, conventional polymer does not have the same conductivity as liquid organic electrolyte. Thus, the development of a polymer electrolyte which has a conductivity close to that of liquid organic electrolyte (about $10^{-3}$ $\Omega^{-1}cm^{-1}$) is crucial to the success of a polymer lithium battery.

Recently, many polymer electrolytes have been disclosed one after the other, such as polyethylene oxides, polyacrylates, polyacrylnitrides and polyvinylidene fluoride/hexafluoropropylenes. Of these, the polymer electrolyte of polyvinylidene fluoride/hexafluoropropylenes has attracted the greatest attention. As proposed by Bellcore in 1994, a co-polymer polyvinylidene fluoride/hexafluoropropylene polymer is mixed with a plasticizer to form a polymer membrane. Then a solvent is used to extract the plasticizer to obtain a porous polymer membrane. Like a sponge, the porous polymer membrane can be impregnated with or adsorb electrolytic solution. The electrolytic solution permeates into the porous polymer membrane, thereby preserving the electrolytic solution in the polymer membrane without spilling. Furthermore, polyvinylidene fluoride/hexafluoropropylene has the advantages of mechanical stability, flame-resistance and electrochemical stability.

However, polyvinylidene fluoride/hexafluoropropylene is a fluoride compound and its production generates heavily toxic hydrogen fluoride, which is a strong irritant and corrosive to humans. This raises the cost due to safety requirements at the manufacturing facility. Therefore, the development of a new polymer electrolyte which is inexpensive, safe to produce, and environmentally friendly is a key developing point in the field of lithium batteries.

SUMMARY OF THE INVENTION

It is therefore an object of the present invention to provide a polymer electrolyte which has high ionic conductivity and excellent electrochemical stability, and is inexpensive, safe to produce and environmentally friendly.

The above object of the invention is attained by using a polycarbonate electrolyte. The polycarbonate electrolyte of the invention is a sponge-like, porous membrane matrix impregnated with lithium salt-containing electrolyte solution. Thus, the polymer electrolyte of the present invention has the advantage that the electrolytic solution can be preserved without spilling. The polycarbonates electrolyte has an ionic conductivity up to $3\times10^{-3}$ $\Omega^{-1}cm^{-1}$ and excellent electrochemical stability. Moreover, since the polycarbonate polymer is not a fluoride compound, its synthesis does not generate heavily toxic hydrogen fluoride, and thus is cheaper to produce, safer, and more environmentally friendly.

BRIEF DESCRIPTION OF THE DRAWINGS

Other objects, features, and advantages of the present invention will become apparent from the following detailed description with reference to the accompanying drawings, in which.

DETAILED DESCRIPTION OF THE INVENTION

Figure 1:
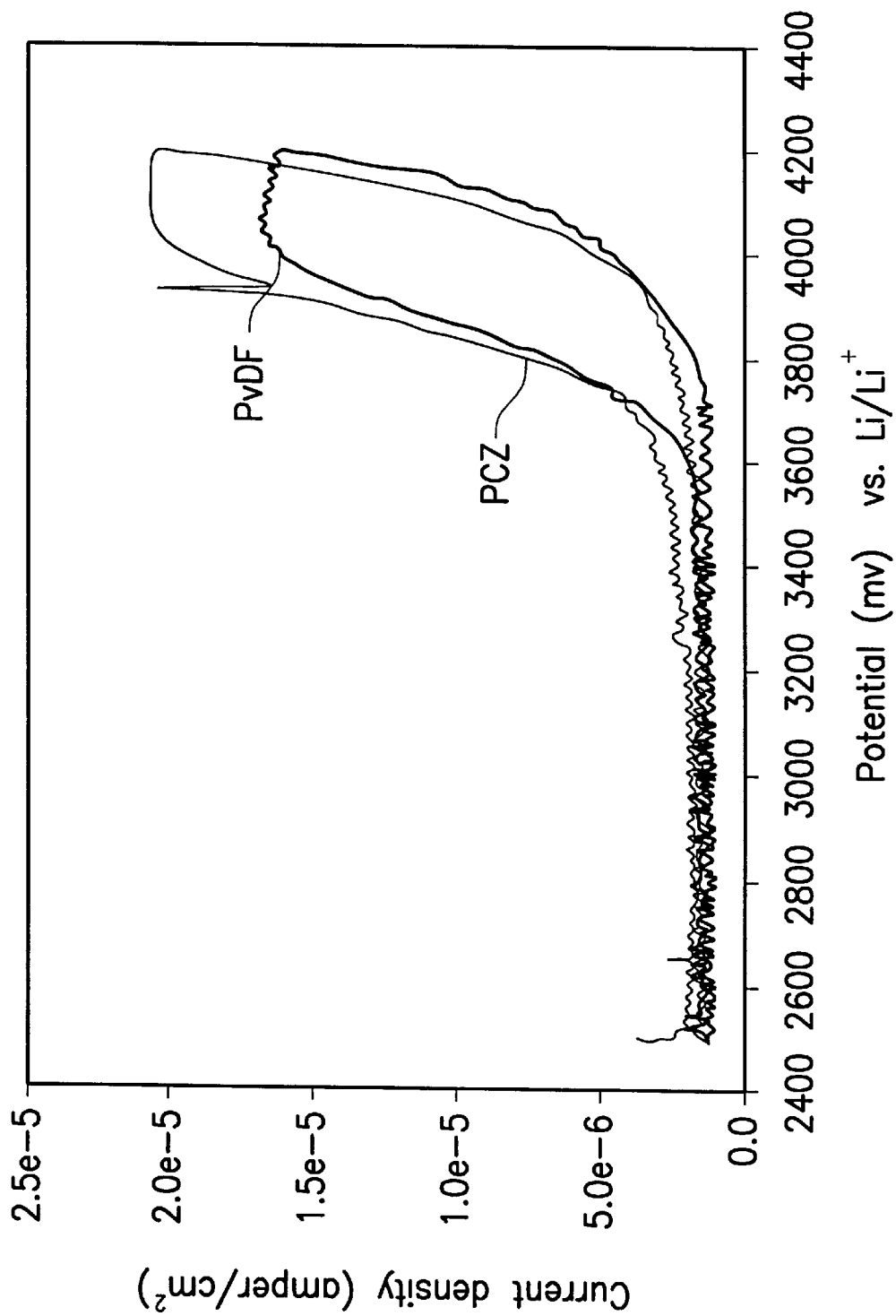
FIG. 1 is the cyclic voltommetry diagram showing the electrochemical stability of the polycarbonate electrolyte of the invention and the polyvinylidene fluoride/hexafluoropropylene electrolyte by using the three-electrode method.

According to the invention, the polycarbonate electrolyte is (a) a polycarbonate membrane matrix, and (b) a lithium salt-containing electrolytic solution impregnated in the polycarbonate membrane matrix. The polycarbonate membrane matrix is sponge-like and porous and includes a filler. The polycarbonate used in the invention has the following structure:

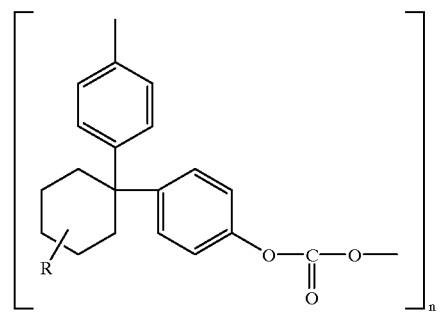

wherein R is hydrogen, methyl, tert-butyl or iso-butyl, and n is about 50 to 1000. A commercially available polycarbonate (Mitsubishi Chemical, Japan), which has a molecular weight of 30,000, is preferably used. The weight ratio between the polycarbonate and the filler is (0.1–5):1 parts by weight. The thickness of the prepared polycarbonate membrane matrix is usually between about 10 to 200 $\mu$m. The inclusion of the filler is to improve the mechanical property of the polycarbonate membrane matrix, to stabilize its structure, and also to increase the ionic conductivity of the polycarbonate membrane. Conventional inorganic oxide, particularly silicon dioxide and alumina, are suitable for this purpose.

The polycarbonate membrane matrix is prepared by dissolving a polycarbonate, a plasticizer and a filler in an organic solution to form a colloidal solution; coating the colloidal solution onto a substrate to form a coated layer; and removing the plasticizer in the coated layer. The function of the plasticizer is to produce pores so that the polycarbonate can adsorb and be impregnated with electrolytic solution. Plasticizers suitable for use in the invention include dibutyl phthalate, propylene carbonate, ethylene carbonate, diethyl carbonate and dimethyl carbonate. The polycarbonate, filler and plasticizer are dissolved in an organic solvent such as methylene chloride to form a colloidal solution. The colloidal solution is then coated onto a substrate such as a plastic sheet. Note the coated layer should be placed in an ambient of about 15–40° C. to evaporate the organic solvent therein before the extraction of the plasticizer. The extraction step can be performed by using petroleum ether, for example diethyl ether, as the extraction solvent.

The polycarbonate membrane from which the plasticizer has been extracted is a sponge-like and porous membrane matrix. The membrane matrix is then impregnated with a lithium salt-containing electrolyte to obtain the polycarbonate electrolyte of the invention. According to the invention, the lithium salt-containing electrolyte is an electrolyte solution containing propylene carbonate, ethylene carbonate and lithium ions. The concentration of the lithium ions is preferably in the range of 1 M~2 M.

Examples of the lithium salt are lithium hexafluorophosphate, lithium hexafluoroarsenate, lithium perchlorate, lithium tetrafluoroborate, lithium bis (trifluoromethylsulfonyl) imide, and lithium tris (trifluoromethylsulfonyl) methide.

The invention also includes a lithium battery using the above polycarbonate electrolyte. In a lithium battery using the polycarbonate electrolyte, the cathode is a metal substrate such as an aluminum foil or net coated with $LiCoO_2$, $LiMn_2O_4$ and $LiNiO_2$, while the anode is lithium metal or a metal substrate such as a copper foil or net coated with graphite or mesophase carbon microbeads (MCMB). Plasticizers of the invention, conductivity aids, binders and the above coating materials are first intensively mixed to obtain a slurry. The obtained slurry is then homogeneously coated onto metal substrates by using, for example, a knife coater, to obtain an anode and a cathode. The anode, cathode and the polycarbonate electrolyte composition are then dried and compressed, followed by the steps of extracting the plasticisers and impregnating with lithium salt-containing electrolyte to obtain the lithium battery of the invention.

The following examples are intended to illustrate the invention more fully without limiting its scope, since numerous modifications and variations will be apparent to those skilled in this art.

EXAMPLE 1

Preparation of Polycarbonate Membrane Matrix 3 g of polycarbonate (Mitsubishi Engineering Plastics Co. Ltd., Japan, PCZ-300), 0.6 g of silicon dioxide, and 3 g, 1.5 g and 0 g of dibutyl phthalate were mixed with 32 g of methylene chloride, and stirred to obtain colloidal solutions. The colloidal solutions were coated onto plastic sheets by using a doctor blade having a gap of 400 micrometer. The coated sheets were then kept at an ambient of 15–40° C. for a sufficient period of time to evaporate the methylene chloride to obtain a polycarbonate membrane containing dibutyl phthalate. The polycarbonate membranes were then peeled off from the plastic sheets and immersed in diethyl ether for 20 minutes to extract the dibutyl phthalate. Sponge-like, porous and dibutyl phthalate-free polycarbonate membranes were then obtained. The thickness of the membranes was measured by a thickness micro meter and the conductivities of the electrolytes were measured with an AC-impedance analyzer. The results are shown in table 1.

TABLE 1

| | Weight of dibutyl phthalate (g) | Thickness of polycarbonate membrane (adsorbing no lithium salt-containing electrolyte) ($\mu$m) | Conductivity ($\Omega^{-1}cm^{-1}$) |
|---|---|---|---|
| 1 | 3 | 68 | $2.2 \times 10^{-4}$ |
| 2 | 1.5 | 78 | $2.5 \times 10^{-4}$ |
| 3 | 0 | 69 | $2.2 \times 10^{-4}$ |

EXAMPLE 2

Preparation of Polycarbonate Electrolyte 3 g of polycarbonate (Mitsubishi Engineering Plastics Co. Ltd., Japan, PCZ-300), 0.6 9 of silicon dioxide, and 3 g, 1.5 g and 0 g of dibutyl phthalate were mixed with 32 g of methylene chloride, and stirred to obtain colloidal solutions. The colloidal solutions were coated onto plastic sheets by using a doctor blade having a gap of 400 micrometer. The coated sheets were then kept at an ambient of 15–40° C. for a sufficient period of time to evaporate the methylene chloride to obtain polycarbonate membranes containing dibutyl phthalate. The polycarbonate membranes were then peeled off from the plastic sheets and immersed in diethyl ether for 20 minutes to extract the dibutyl phthalate. Sponge-like, porous and dibutyl phthalate-free polycarbonate membranes were then obtained. The obtained sponge-like polycarbonate membranes were then impregnated with an electrolytic solution containing propylene carbonate, ethylene carbonate (1:1(v/v)) and 1 M lithium hexafluorophosphate to obtain polycarbonate electrolytes. The conductivities of the electrolytes were measured with an AC-impedance analyzer. The results are shown in Table 2.

TABLE 2

| | Weight of dibutyl phthalate (g) | Thickness of polycarbonate membrane (after adsorbing lithium salt-containing electrolyte) ($\mu$m) | Conductivity ($\Omega^{-1}cm^{-1}$) |
|---|---|---|---|
| 1 | 3 | 68 | $3 \times 10^{-3}$ |
| 2 | 1.5 | 76 | $1.6 \times 10^{-3}$ |
| 3 | 0 | 70 | $2.5 \times 10^{-3}$ |

EXAMPLE 3

Preparation of Polycarbonate Electrolyte 3 g of polycarbonate (Mitsubishi Engineering Plastics Co. Ltd., Japan, PCZ-300), 0.6 g of silicon dioxide, and 3 g, 1.5 g and 0 g of propylene carbonate were mixed with 32 g of methylene chloride, and stirred to obtain colloidal solutions. The colloidal solutions were coated onto plastic sheets by using a doctor blade having a gap of 400 micrometer. The coated sheets were then kept at an ambient of 15–40° C. for a sufficient period of time to evaporate the methylene chloride to obtain a polycarbonate membrane containing dibutyl phthalate. The polycarbonate membrane was then peeled off from the plastic sheets and immersed in diethyl ether for 20 minutes to extract the dibutyl phthalate. Sponge-like, porous and dibutyl phthalate-free polycarbonate membranes were then obtained. The obtained sponge-like polycarbonate membranes were then impregnated with an electrolytic solution containing propylene carbonate, ethylene carbonate (1:1(v/v)) and 1 M lithium hexafluorophosphate to obtain polycarbonate electrolytes. The conductivities of the electrolytes were measured with an AC-impedance analyzer. The results are shown in Table 3.

TABLE 3

| No. | Weight of propylene carbonate (g) | Thickness of polymer polycarbonate membrane (after adsorbing lithium salt-containing electrolyte) (μm) | Conductivity ($\Omega^{-1}cm^{-1}$) |
| --- | --- | --- | --- |
| 1 | 3 | 68 | $2.8 \times 10^{-3}$ |
| 2 | 1.5 | 78 | $1.6 \times 10^{-3}$ |
| 3 | 0 | 69 | $3.0 \times 10^{-3}$ |

The electrochemical stability of the No. 2 polycarbonate electrolyte prepared in this example and a polyvinylidene fluoride/hexafluoropropylene electrolyte prepared by the same method (using 6 g of polyvinylidene fluoride/hexafluoropropylene, 6 g of propylene carbonate and 0.3 g of silicon dioxide) were measured by the three electrode method. According to the method, the No. 2 polycarbonate electrolyte and the polyvinylidene fluoride/hexafluoropropylene electrolyte were respectively placed in a test cell in which a lithium foil disposed at one side of a polymer electrolyte membrane is used as the counter electrode while an aluminum foil disposed at the other side of the polymer electrolyte membrane is used as the working electrode, and a thin lithium electrode is used as the reference electrode. The voltage scanning speed was 2 mv/sec. The results are shown in FIG. 1. As can be seen from FIG. 1 that the current densities for both the PCZ curve and the PVdF curve remain low when the voltage is lower than 3600 mV. This indicates no oxidation-reduction reaction. When the voltage is greater than 3600 mV, the current densities rise slightly. This indicates that the surface of the aluminum foil is oxidized and a passivation layer is formed gradually, and thus when the voltage is scanned back, the current densities become smaller due to the high resistance of the passivation layer. Similar to the polyvinylidene fluoride/hexafluoropropylene electrolyte, the polycarbonate electrolyte of the invention will not cause oxidation-reduction reaction in the range of the normal working voltage of a lithium battery and thus has excellent electrochemical stability.

EXAMPLE 4

Preparation of a Lithium Battery (a) Preparation of a Cathode 85 g of LiCoO$_2$, 5 g of polyvinylidene fluoride/hexafluoropropylene binder (Solvay, USA, Cat. No. SOLEF 20810), and 10 g of conductivity aid (Timcal Ltd., Switzerland, Cat. No. KS-6) were poured into a mixed solvent of acetone/dibutyl phthalate solvent (25.5 g/2.5 g) and stirred with a magnetic stirrer for 30 minutes to obtain a slurry. The slurry was then coated onto the two sides of several aluminum nets (Fukuda metal Co., Ltd, Japan) by using a doctor blade having a gap of 250 μm. The coated nets were then kept at room temperature for a period of time sufficient to evaporate acetone. These coated nets were then calendered under a pressure of 2000 kg/cm$^2$ to form the laminated cathode.

(b) Preparation of an Anode 95 g of mesophase carbon microbeads (MCMB), 5 g of polyvinylidene fluoride/hexafluoropropylene binder (Solvay, USA, Cat. No. SOLEF 20810), and 10 g of conductivity aid (Timcal Ltd., Switzerland, Cat. No. KS-6) were poured into a mixed solvent of acetone/dibutyl phthalate solvent (25.5 g/2.5 g) and stirred with a magnetic stirrer for 30 minutes to obtain a slurry. The slurry was then coated onto the two sides of several copper nets (Fukuda metal Co., Ltd, Japan) by using a doctor blade having a gap of 250 μm. The coated nets were then kept at room temperature for a period of time sufficient to evaporate acetone. These coated nets were then calendered under a pressure of 2000 kg/cm$^2$ to form the laminated cathode.

c. Fabrication of a Lithium Battery

A 5×4 cm$^2$ laminated anode, a 5.5×5 cm$^2$ polycarbonate membrane prepared in example 2 and a 5×4 cm$^2$ laminated cathode were placed in a hot press and compressed and laminated under a pressure of 2000 PSI at 60° C. for 15 minutes.

The laminated electrode assembly was then immersed in 50 ml of diethyl ether for 20 minutes to extract dibutyl phthalate contained therein, followed by drying at 50° C. The dried electrode assembly was then placed in a vacuum oven (1 torr, 80° C.) for 24 hours. Thereafter, the electrode assembly was impregnated with an 1 M lithium hexafluorophosphate electrolyte containing propylene carbonate and ethylene carbonate (1:1(v/v)) to obtain the polycarbonate electrolyte lithium battery of the invention.

Figure 2:
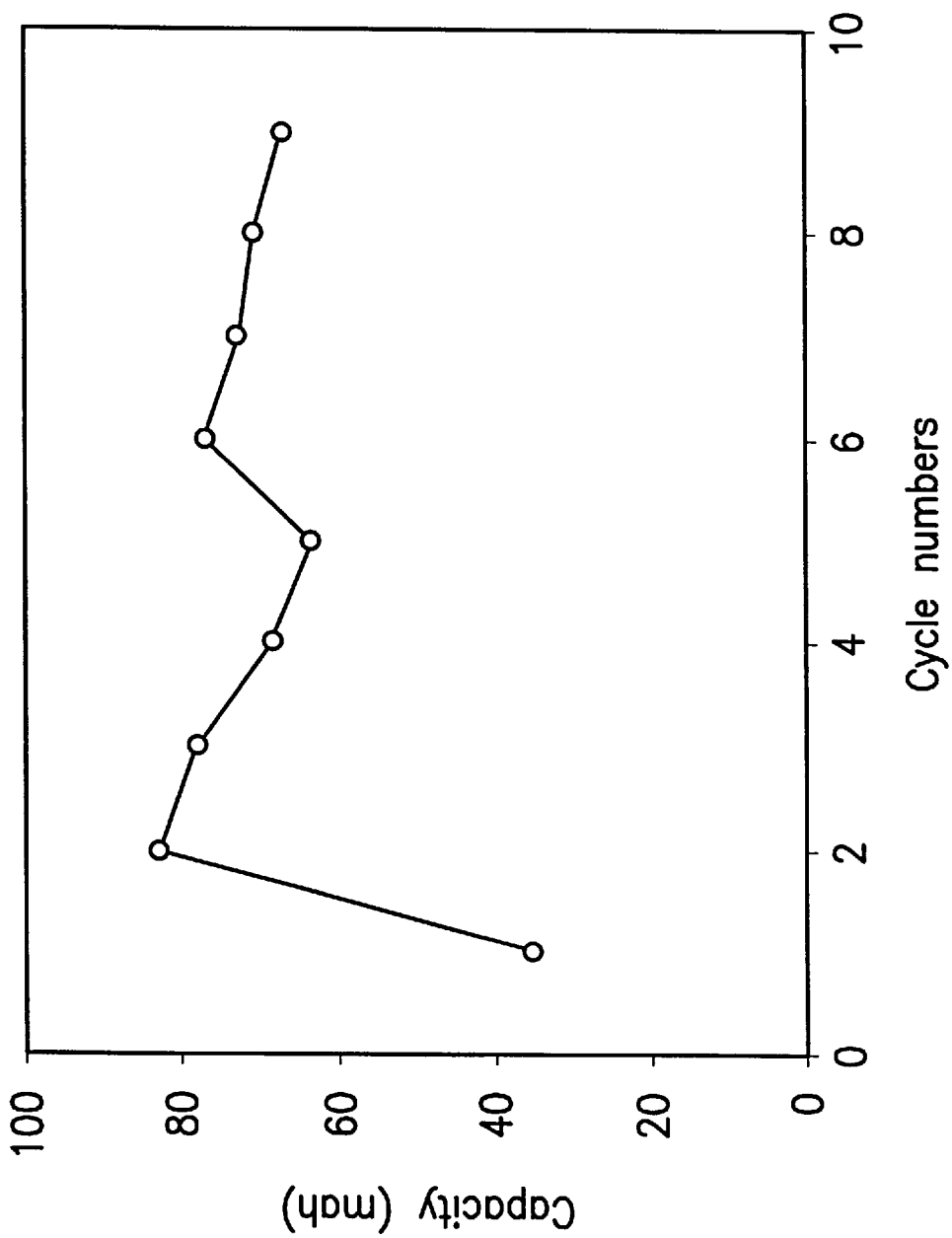
FIG. 2 is a diagram showing the cyclic discharge capacities measured from the lithium battery using the polycarbonate electrolyte of the invention.
Figure 3:
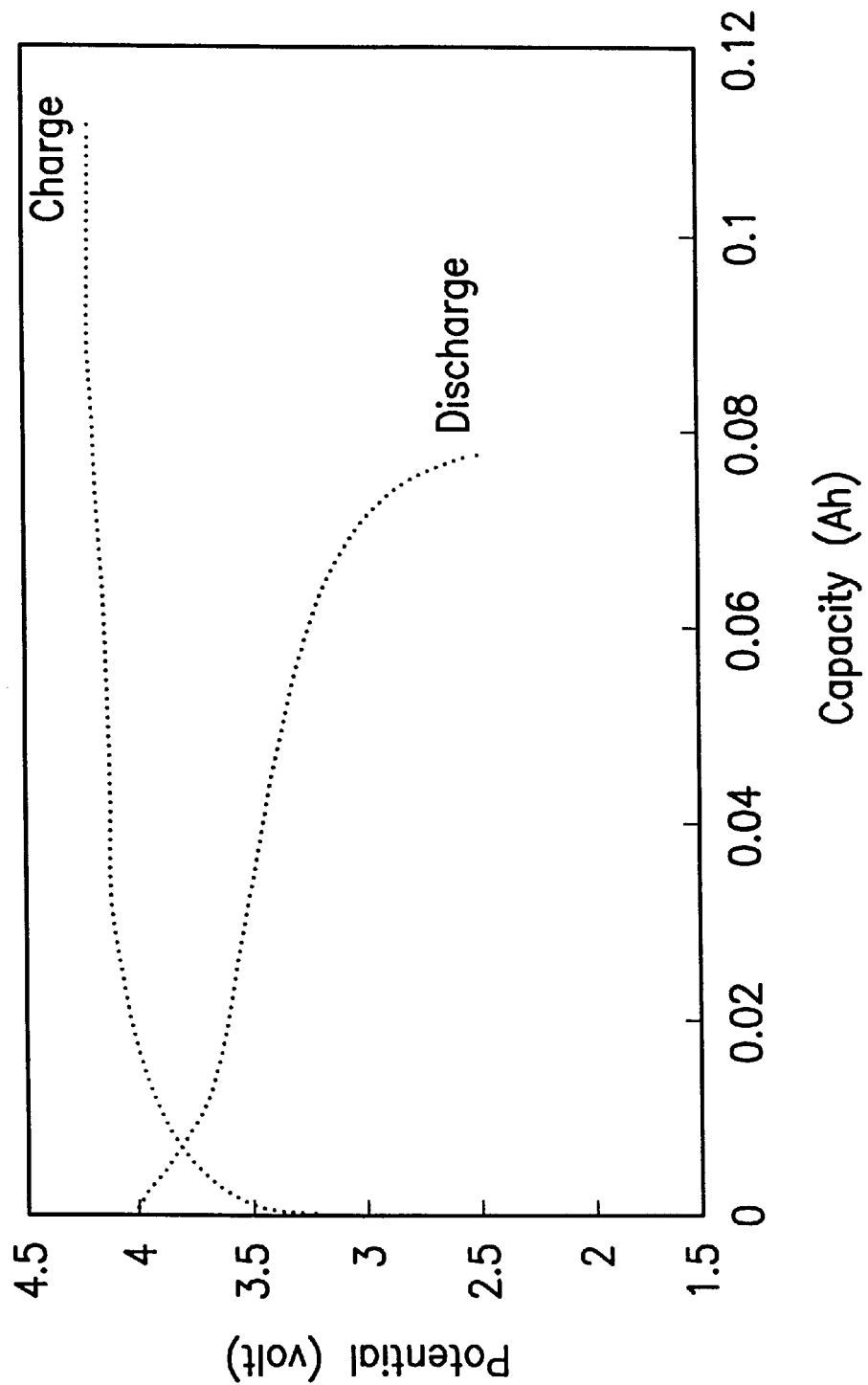
FIG. 3 is a diagram showing charge and discharge potential curves measured from the lithium battery using the polycarbonate electrolyte of the invention.

The charge/discharge test of the lithium battery thus obtained was performed and the results are shown in FIG. 2 and FIG. 3. As indicated in FIG. 2, the lithium battery of the invention possesses charge/discharge capability. Also, the charge and discharge potential curves of the lithium battery is illustrated in FIG. 3.

While the invention has been described by way of example and in terms of the preferred embodiment, it is to be understood that the invention is not limited to the disclosed embodiments. On the contrary, it is intended Lo cover various modifications and similar arrangements as would be apparent to those skilled in the art. Therefore, the scope of the appended claims should be accorded the broadest interpretation so as to encompass all such modifications and similar arrangements.

What is claimed is:

1. A polycarbonate electrolyte comprising:

(a) a polycarbonate membrane matrix, comprising a polycarbonate and a filler, said polycarbonate having the formula:

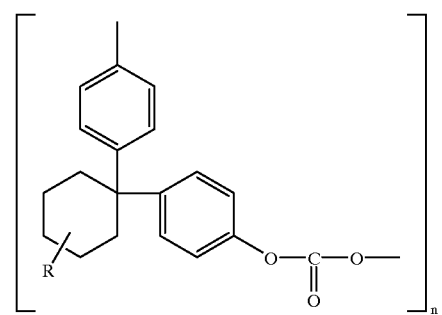

wherein R is hydrogen or alkyl having a carbon number of 1–10 and n is an integer within a range of between about 50 and about 1,000; and (b) a lithium salt-containing electrolytic solution impregnated into said polycarbonate membrane matrix.

2. The polycarbonate electrolyte as claimed in claim 1, wherein the weight ratio of said polycarbonate to said filler is within a range of between about 0.1 and about 5 to about 1.0.

3. The polycarbonate electrolyte as claimed in claim 1, wherein said filler is an inorganic oxide.

4. The polycarbonate electrolyte as claimed in claim 3, wherein said inorganic oxide is selected from the group consisting of silicon dioxide and alumina.

5. The polycarbonate electrolyte as claimed in claim 1, wherein said lithium salt is selected from the group consisting of lithium hexafluorophosphate, lithium hexafluoroarsenate, lithium perchlorate, lithium tetrafluoroborate, lithium bis(trifluoromethylsulfonyl)imide, and lithium tris(trifluoromethylsulfonyl)methide.

6. The polycarbonate electrolyte as claimed in claim 1, wherein the thickness of said polycarbonate membrane is about 10–200 μm.

7. The polycarbonate electrolyte as claimed in claim 1, wherein said electrolytic solution comprises propylene carbonate and ethylene carbonate.

8. The polycarbonate electrolyte as claimed in claim 1, wherein said polycarbonate membrane matrix is a porous matrix.

9. A method of preparing a polycarbonate membrane matrix, comprising the following steps:
   (a) dissolving a polycarbonate, a plasticizer and a filler in an organic solution to form a colloidal solution, wherein the polycarbonate has the formula:

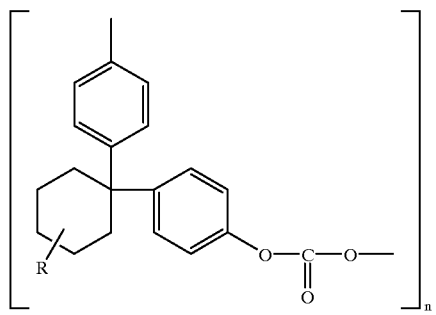

wherein R is hydrogen or alkyl having a carbon number of 1–10, and n is an integer within a range of between about 50 and about 1,000;

(b) coating said colloidal solution onto a substrate to form a coated layer; and (c) removing said plasticizer in said coated layer to obtain said polycarbonate membrane matrix.

10. The method as claimed in claim 9, wherein the weight ratio of polycarbonate: plasticizer: filler is 0.1–5:1.0–5:1.0.

11. The method as claimed in claim 9, wherein said plasticizer is selected from the group consisting of dibutyl phthalate, propylene carbonate, ethylene carbonate, diethyl carbonate and dimethyl carbonate.

12. The method as claimed in claim 9, wherein said filler is an inorganic oxide.

13. The method as claimed in claim 12, wherein said inorganic oxide is selected from the group consisting of silicon dioxide and alumina.

14. The method as claimed in claim 9, wherein the step (c) comprises extracting said plasticizer from said coated layer.

15. The method as claimed in claim 9, wherein in step (b) said substrate is a plastic sheet.

16. The method as claimed in claim 9, wherein said step (b) comprises drying said coated layer.

17. The method as claimed in claim 9, wherein said organic solution is a solution of methylene chloride.

18. A lithium-polymer battery comprising:
   (a) an anode;
   (b) a cathode; and
   (c) a polycarbonate electrolyte as claimed in claim 1 disposed between said anode and said cathode.

* * * * *